US005796832A

United States Patent [19]

Kawan

[11] Patent Number: 5,796,832
[45] Date of Patent: Aug. 18, 1998

[54] WIRELESS TRANSACTION AND INFORMATION SYSTEM

[75] Inventor: Joseph C. Kawan, Hollywood, Calif.

[73] Assignee: Transaction Technology, Inc., Santa Monica, Calif.

[21] Appl. No.: 558,091

[22] Filed: Nov. 13, 1995

[51] Int. Cl.$^6$ ...................................................... H04L 9/00
[52] U.S. Cl. ............................................... 380/24; 380/25
[58] Field of Search ................................. 380/24, 25, 23; 235/380; 340/825.34

[56] References Cited

U.S. PATENT DOCUMENTS

| | | |
|---|---|---|
| Re. 34,034 | 8/1992 | O'Sullivan . |
| D. 202,110 | 8/1965 | Wann . |
| D. 211,253 | 6/1968 | Sundquist . |
| D. 227,482 | 6/1973 | Binks . |
| D. 244,617 | 6/1977 | Breger . |
| D. 282,165 | 1/1986 | Brown . |
| D. 282,927 | 3/1986 | Story et al. . |
| D. 284,856 | 7/1986 | Marshall . |
| D. 288,808 | 3/1987 | Asaki et al. . |
| D. 299,030 | 12/1988 | Menn . |
| D. 303,522 | 9/1989 | Meda et al. . |
| D. 304,932 | 12/1989 | Oura et al. . |
| 2,541,270 | 2/1951 | Mitnick . |
| 2,593,475 | 4/1952 | Neilsen . |
| 3,515,814 | 6/1970 | Morgan . |
| 3,596,256 | 7/1971 | Alpert et al. . |
| 3,652,795 | 3/1972 | Wolf et al. . |
| 3,727,186 | 4/1973 | Stephenson, Jr. et al. . |
| 3,760,375 | 9/1973 | Irwin et al. . |
| 3,833,885 | 9/1974 | Gentile et al. . |
| 3,852,571 | 12/1974 | Hall et al. . |
| 3,865,994 | 2/1975 | Bender . |
| 3,932,709 | 1/1976 | Hoff et al. . |
| 3,938,090 | 2/1976 | Borison et al. . |
| 3,956,615 | 5/1976 | Anderson et al. . |
| 3,987,259 | 10/1976 | Larson . |
| 3,995,123 | 11/1976 | Wilson . |
| 4,023,013 | 5/1977 | Kinker . |
| 4,025,760 | 5/1977 | Trenkamp . |
| 4,032,931 | 6/1977 | Haker . |
| 4,071,697 | 1/1978 | Bushnell et al. . |

(List continued on next page.)

FOREIGN PATENT DOCUMENTS

| | | |
|---|---|---|
| 0181438 | 5/1986 | European Pat. Off. . |
| 0085482 | 10/1987 | European Pat. Off. . |
| 0014313 | 8/1989 | European Pat. Off. . |
| 2309915 | 11/1976 | France . |
| 2632106 | 1/1978 | Germany . |
| 2709461 | 9/1978 | Germany . |

(List continued on next page.)

OTHER PUBLICATIONS

PCT International Search Report—PCT/US96/17902.
"Managerial Leadership: A Key to Electronic Payment Success," vol. LXXI, No. 4, pp. 22–28, Apr. 1986, *Economic Review*, Federal Reserve Bank of Atlanta.
"Scenarios for the Future of the ACH," vol. LXXI, No. 4, pp. 29–50, Apr. 1986 *Economic Review*, Federal Reserve Bank of Atlanta.
"Desiderata for a Viable ACH," vol. LXXI, No. 3, pp. 34–43, Mar. 1986, *Economic Review*, Federal Reserve Bank of Atlanta.
Discovering Direct Access, 1987, Citibank, N.A.

(List continued on next page.)

*Primary Examiner*—Salvatore Cangialosi
*Attorney, Agent, or Firm*—Kilpatrick Stockton LLP; George T. Marcou

[57] ABSTRACT

A financial information and transaction system utilizes wireless communication in connection with portable terminals. In this system, a terminal is connected to the financial institution via a wireless or cellular telephone hook-up. Smart cards are utilized to verify authorization for transactions, thereby minimizing potential security problems which could otherwise result from use of a mobile terminal. Alternately, a smart card is advantageously utilized not only for authorization, but also to maintain a secure record of available funds. The system not only provides the functionality of an ATM network, but also provides non-financial services, thereby forming an integrated system.

31 Claims, 9 Drawing Sheets

U.S. PATENT DOCUMENTS

| | | |
|---|---|---|
| 4,075,460 | 2/1978 | Gorgens . |
| 4,091,448 | 5/1978 | Clausing . |
| 4,114,027 | 9/1978 | Slater et al. . |
| 4,185,282 | 1/1980 | Pick . |
| 4,186,438 | 1/1980 | Benson et al. . |
| 4,277,837 | 7/1981 | Stuckert . |
| 4,291,198 | 9/1981 | Anderson et al. . |
| 4,291,199 | 9/1981 | Densmore et al. . |
| 4,301,337 | 11/1981 | Eventoff . |
| 4,313,176 | 1/1982 | Cecil . |
| 4,319,336 | 3/1982 | Anderson et al. . |
| 4,334,126 | 6/1982 | Slingsby . |
| 4,341,951 | 7/1982 | Benton . |
| 4,381,427 | 4/1983 | Cheal et al. . |
| 4,409,450 | 10/1983 | Blades . |
| 4,423,294 | 12/1983 | Walser et al. . |
| 4,425,627 | 1/1984 | Eibner . |
| 4,431,870 | 2/1984 | May et al. . |
| 4,454,414 | 6/1984 | Benton . |
| 4,468,529 | 8/1984 | Samuel et al. . |
| 4,476,349 | 10/1984 | Cottrell et al. . |
| 4,481,574 | 11/1984 | DeFino et al. . |
| 4,493,021 | 1/1985 | Agrawal et al. . |
| 4,494,194 | 1/1985 | Harris et al. . |
| 4,503,288 | 3/1985 | Kessler . |
| 4,510,351 | 4/1985 | Costello et al. . |
| 4,532,378 | 7/1985 | Nakayama et al. . |
| 4,533,791 | 8/1985 | Read et al. . |
| 4,536,647 | 8/1985 | Atalla et al. . |
| 4,578,174 | 3/1986 | Kato et al. . |
| 4,578,537 | 3/1986 | Faggin et al. . |
| 4,580,011 | 4/1986 | Glaser . |
| 4,585,908 | 4/1986 | Smith . |
| 4,591,662 | 5/1986 | Legros et al. . |
| 4,598,174 | 7/1986 | Pommer, II . |
| 4,604,686 | 8/1986 | Reiter et al. . |
| 4,607,144 | 8/1986 | Carmon et al. . |
| 4,611,277 | 9/1986 | Kemppainen et al. . |
| 4,625,276 | 11/1986 | Benton et al. . |
| 4,629,832 | 12/1986 | Carson et al. . |
| 4,631,666 | 12/1986 | Harris et al. . |
| 4,634,845 | 1/1987 | Hale et al. . |
| 4,639,917 | 1/1987 | Furuta . |
| 4,649,563 | 3/1987 | Riskin . |
| 4,652,704 | 3/1987 | Franklin . |
| 4,653,086 | 3/1987 | Laube . |
| 4,659,876 | 4/1987 | Sillivan et al. . |
| 4,659,879 | 4/1987 | Hasegawa . |
| 4,663,766 | 5/1987 | Bremer . |
| 4,674,115 | 6/1987 | Kaleita et al. . |
| 4,682,014 | 7/1987 | Iwama . |
| 4,683,360 | 7/1987 | Maser . |
| 4,688,170 | 8/1987 | Waite et al. . |
| 4,697,281 | 9/1987 | O'Sullivan . |
| 4,701,845 | 10/1987 | Andreasen et al. . |
| 4,710,955 | 12/1987 | Kauffman . |
| 4,714,989 | 12/1987 | Billings . |
| 4,724,521 | 2/1988 | Carron et al. . |
| 4,725,977 | 2/1988 | Izumi et al. . |
| 4,727,243 | 2/1988 | Savar . |
| 4,734,858 | 3/1988 | Schlafly . |
| 4,737,980 | 4/1988 | Curtin et al. . |
| 4,744,103 | 5/1988 | Dahlquist et al. . |
| 4,748,656 | 5/1988 | Gibbs et al. . |
| 4,754,326 | 6/1988 | Kram et al. . |
| 4,788,657 | 11/1988 | Douglas et al. . |
| 4,796,297 | 1/1989 | Okamoto . |
| 4,797,914 | 1/1989 | Vaello . |
| 4,814,972 | 3/1989 | Winter et al. . |
| 4,817,129 | 3/1989 | Riskin . |
| 4,823,264 | 4/1989 | Deming . |
| 4,839,919 | 6/1989 | Borges et al. . |
| 4,850,007 | 7/1989 | Marino et al. . |
| 4,851,994 | 7/1989 | Toda et al. . |
| 4,852,127 | 7/1989 | Fraser et al. . |
| 4,852,151 | 7/1989 | Dittakavi et al. . |
| 4,858,114 | 8/1989 | Heath et al. . |
| 4,860,342 | 8/1989 | Danner . |
| 4,870,677 | 9/1989 | DiSanto et al. . |
| 4,885,580 | 12/1989 | Noto et al. . |
| 4,885,765 | 12/1989 | Shirakawa . |
| 4,897,868 | 1/1990 | Engelke et al. . |
| 4,905,186 | 2/1990 | Fukui . |
| 4,926,325 | 5/1990 | Benton et al. . |
| 4,933,971 | 6/1990 | Bestock et al. . |
| 4,935,870 | 6/1990 | Burk, Jr. et al. . |
| 4,943,995 | 7/1990 | Daudelin et al. . |
| 4,951,278 | 8/1990 | Biber et al. . |
| 4,956,852 | 9/1990 | Hodge . |
| 4,958,278 | 9/1990 | Meguro . |
| 4,972,457 | 11/1990 | O'Sullivan . |
| 4,972,463 | 11/1990 | Danielson et al. . |
| 4,982,430 | 1/1991 | Frezza et al. . |
| 4,991,133 | 2/1991 | Davis et al. . |
| 4,991,199 | 2/1991 | Parekh et al. . |
| 4,995,074 | 2/1991 | Goldman et al. . |
| 5,008,927 | 4/1991 | Weiss et al. . |
| 5,008,930 | 4/1991 | Gawrys et al. . |
| 5,012,512 | 4/1991 | Basso et al. . |
| 5,014,190 | 5/1991 | Johnson . |
| 5,018,189 | 5/1991 | Kurosawa et al. . |
| 5,020,100 | 5/1991 | Gardiner . |
| 5,025,373 | 6/1991 | Keyser, Jr. et al. . |
| 5,027,315 | 6/1991 | Agrawal et al. . |
| 5,038,284 | 8/1991 | Kramer . |
| 5,038,372 | 8/1991 | Elms et al. . |
| 5,050,207 | 9/1991 | Hitchcock . |
| 5,058,000 | 10/1991 | Cox et al. . |
| 5,060,152 | 10/1991 | Maeser et al. . |
| 5,065,309 | 11/1991 | Putnam et al. . |
| 5,065,425 | 11/1991 | Lecomte et al. . |
| 5,072,441 | 12/1991 | Szwarc . |
| 5,077,788 | 12/1991 | Cook et al. . |
| 5,081,673 | 1/1992 | Engelke et al. . |
| 5,103,392 | 4/1992 | Mori . |
| 5,124,909 | 6/1992 | Blakely et al. . |
| 5,127,041 | 6/1992 | O'Sullivan . |
| 5,155,847 | 10/1992 | Kirouac et al. . |
| 5,164,982 | 11/1992 | Davis . |
| 5,175,817 | 12/1992 | Adams et al. . |
| 5,185,742 | 2/1993 | Bales et al. . |
| 5,191,611 | 3/1993 | Lang ........................ 380/25 |
| 5,195,129 | 3/1993 | Yazawa et al. . |
| 5,195,130 | 3/1993 | Weiss et al. . |
| 5,202,825 | 4/1993 | Miller et al. . |
| 5,218,680 | 6/1993 | Farrell et al. . |
| 5,220,501 | 6/1993 | Lawlor et al. . |
| 5,221,838 | 6/1993 | Gutman et al. . |
| 5,227,778 | 7/1993 | Vacon et al. . |
| 5,235,595 | 8/1993 | O'Dowd . |
| 5,245,651 | 9/1993 | Takashima et al. . |
| 5,249,218 | 9/1993 | Sainton . |
| 5,265,033 | 11/1993 | Vajk et al. . |
| 5,274,810 | 12/1993 | Meldrum . |
| 5,276,529 | 1/1994 | Williams . |
| 5,321,840 | 6/1994 | Ahlin et al. . |
| 5,341,428 | 8/1994 | Schatz ........................ 380/24 |
| 5,347,632 | 9/1994 | Filepp et al. . |
| 5,383,113 | 1/1995 | Kight et al. . |
| 5,461,217 | 10/1995 | Claus ........................ 235/380 |
| 5,530,438 | 6/1996 | Bickman et al. ........................ 380/23 |
| 5,561,282 | 10/1996 | Price et al. ........................ 234/380 |

| B1 4,947,028 | 6/1993 | Gorog . |
|---|---|---|

FOREIGN PATENT DOCUMENTS

| 3212554 | 10/1983 | Germany . |
|---|---|---|
| 3423090 | 1/1985 | Germany . |
| 3405448 | 11/1987 | Germany . |
| 54-15606 | 2/1979 | Japan . |
| 57-41723 | 9/1982 | Japan . |
| 63-136758 | 8/1988 | Japan . |
| 1324616 | 7/1973 | United Kingdom . |
| 1523691 | 9/1978 | United Kingdom . |
| 2128447 | 4/1984 | United Kingdom . |
| 8600015 | 8/1986 | WIPO . |
| 8800371 | 1/1988 | WIPO . |
| 9006517 | 5/1991 | WIPO . |

OTHER PUBLICATIONS

"Electronic Payments at the Crossroads," vol. LXXI, No. 3, pp. 20–33, Mar. 1986 *Economic Review*, Federal Reserve Bank of Atlanta.

"Electronic Payment Basics/ACH Returns," vol. LXXI, No. 3, pp. 9–18, Mar. 1986, *Economic Review*, Federal Reserve Bank of Atlanta.

"Corporate Trade Payments: Hard Lessons in Product Design," vol. LXXI, No. 4, pp. 9–21, Apr. 1986, *Economic Review*, Federal Reserve Bank of Atlanta.

"Dr. Frankenstein and the ACH," vol. LXXI, No. 4, pp. 48, Apr. 1986, *Economic Review*, Federal Reserve Bank of Atlanta.

"Homebase User Manual," 1984, Citibank, N.A.

"The ACH: An Elusive Dream," vol. LXXI, No. 3, pp. 4–8, Mar. 1986, *Economic Review*, Federal Reserve Bank of Atlanta.

"The Delicate Balance of ATM Industry Standards," *The EFT Sourcebook*, pp. 35–50, Table 1–4, 1988.

"Compuserve Home Banking System Offered in Machusetts, Ohio," *American Banker*, Sep. 22, 1982, p. 9.

"8 Banks and Thrifts in 3 States launch Video Banking Service," *American Banker*, Jun. 9, 1987, pp. 2, 25.

"Data Networks," Bertsekas et al., 1987, p. 64.

"Low–Cost Computer Terminal Designed for Home Banking," *American Banker*, Apr. 4, 1984, pp. 8, 17.

"Viewtron Entering Pittsburge in Deal With Dollar Bank," *American Banker*, Apr. 4, 1984, pp. 8, 17.

"Case Study: The CIRRUS Banking Network," *Communications of the ATM*, Aug. 1985, vol. 28, No. 8, pp. 798–807.

"Is Home Banking for Real?" *Datamation*, Sep. 15, 1986, vol. 32, p. 128.

"Home Banking System is Micro Friendly," *American Banker*, Jul. 13, 1983, p. 1.

"Electronic Banking Heads Toward Cashless Society," *New Mexico Business Journal*, 1994, vol. 9, No. 6, p. 19.

"NBD Automatic Electronic Highway for Network of Shared ATMs," *American Banker*, Apr. 11, 1984, p. 8.

"New Jersey ATM Network Will Offer Home Banking Service Through Video," *American Banker*, Jul. 14, 1982, p. 8.

"Electronic Networks Springing Up All Over: Systems Linking, Automated Teller Machines, Point–of–Sale Devices Are Established or Contemplated in Several Areas of the Country," *American Banker*, Mar. 19, 1982, p. 2.

"Airline Credit Union Ready for Takeoff with Electronic and Telephone Banking," *American Banker*, May 15, 1985, pp. 24, 91 (Abstract).

"Over 100 Shared Automatic Teller machine (ATM) Networks Are Operating in the U.S.," *Economist*, Mar. 27, 1982, pp. 83, 84 (Abstract).

"Home Banking: MCI Communications Venture to be Delayed Until Next Year," *American Banker*, Jun. 28, 1984, pp. 2, 18 (Abstract).

"NBD Offers Electronic Highway for Network of Shared ATMs," *American Banker*, Apr. 11, 1984, p. 8.

Megatel Computer Corporation, "V–40–Based Single–Board Computer Technical Manual," Aug. 1, 1989.

B.A. Pargh Company, Inc. Catalog, DEX–A–PHONE—Tray.

B.A. Pargh Company, Inc., Catalog, Dictograph—Dial–It–Portable Dialer, 1985–86; p. 345.

"Class Feature: Calling Number Delivery," Bellcore Technical Reference TR–SY000031, Issue 2, Jun. 1988.

Displayphone: Telephone and Terminal Combine in a Compact Desk–Top Unit, Adkins et al., Bell–Northern Research, Ltd., 1982, pp. 2–7.

"Intelligent Telephone," IBM Technical Disclosure Bulletin, vol. 23, No. 9 Feb. 1981.

"New Generation Microprocessor for Telecommunication Application," *Proceeding of the IEEE International Conference on Communications*, Subhash, Bal, 1980.

Plessey Publication, "Plessey IBIS Videotex System" (1982).

Plessey Publication, "Plessey Microphone", (1987) Feb. 1981.

"Plessey Vutel," Plessey Publication No. 7871/6 6/82 5M, 1983.

"The Programmable Gate Array Data Book," Xilinx, 1988, pp. 6–38, to 6–40.

"Programmable Gate Arrays and Self–Diagnosing Hardware," Xilinx, 1989, pp. 6–54 to 6–56.

"QWERTYphone—A Low Cost Integrated Microprocessor," Data Terminal, G.M. Durkin, British Telecommunications Engineering, vol. 5, Jan. 1987.

"SPCS Customer Premises Equipment Data Interface", Bellcore Technical Reference TR–SY000030, Issue 1, Nov. 1988 Subhash, Bal, 1980.

"Special Section: The Telephone Becomes an Information Terminal," Computopia, May 1987, p. 41.

"This Thing Has to Change People's Habits," Forbes, Jun. 26, 1989.

"Understanding Telephone Electronics," Howard W. Swarns & Company, Fike et al., 1980, pp. 119–150.

"XC3000 Logic Cell Array Family," Xilinx, no date, pp. 2–1 5o 2–20 and 6–1 to 6–40.

"A New Generation of Information Terminals," CERMETEK, Apr. 23, 1987.

WIRELESS TRANSACTION AND INFORMATION SYSTEM

FIELD OF THE INVENTION

This invention relates to a system for providing information and performing financial transactions. In particular, it relates to a financial system which utilizes wireless, portable terminals for providing financial information and performing financial transactions.

CROSS-REFERENCE TO RELATED APPLICATION

Reference is made to commonly owned co-pending application Ser. No. 08/177,548 entitled "WIRELESS SCREEN TELEPHONE," the disclosure of which is incorporated by reference herein.

BACKGROUND OF THE INVENTION

The proliferation of automated teller machines (ATMs) has revolutionized the banking and financial services industry by increasing the ability to provide financial services to the consumer. For example, in the past virtually all consumer transactions were conducted in person. Thus, consumer access was generally limited to the business hours of branch locations. With the advent of ATM and other financial networks, consumers may now access financial services virtually twenty-four hours a day, seven days a week. This results in increased convenience and efficiency both for the service provider and the consumer.

Despite these successes, ATM and other financial networks in use today are characterized by certain shortcomings which limit consumer access and provide a barrier to more widespread accessibility and use. For example, the ATMs in greatest use today are hard wired in a fixed location. This hard wiring is necessary to provide power for the terminal and to provide access to communication lines, such as telephone lines, over which data may be exchanged with the financial service provider. Security concerns also play a role in limiting ATMs to fixed locations.

As a result of the fixed location of such terminals, financial networks must take great care in distributing ATMs over a particular geographic region so as to maximize consumer access. However, with changing demographics, such distributions may become less advantageous. For example, a new shopping mall may open in a first location, increasing demand in that area, while another mall may close in a second location thereby decreasing demand in that location. One-time or isolated events resulting in an unexpected influx of people to a particular area may also result in an overwhelming demand which cannot be met satisfactorily by an existing distribution of terminals.

Currently, such problems may be addressed by providing additional ATM terminals. However, the capital costs of such terminals and the necessary peripheral equipment, such as power supplies, maintenance facilities and so forth may be too prohibitive to permit adaptive response to the above-described changes in consumer demand.

Accordingly, there is a need for a financial transaction and information system which can overcome the aforementioned shortcomings. Specifically, there is a need to provide transaction and information terminals which can be conveniently repositioned by the operator as necessary to maximize availability and use of the financial services provided thereby. Further, there is a need for transaction and information terminals which do not need to be directly connected by lines to a telephone network or power source network.

There is an additional need to provide the above-described features without compromising the security provided by existing systems and without introducing inordinate costs.

SUMMARY OF THE INVENTION

It is an object of the invention to meet these needs, and others, through a financial information and transaction system which utilizes wireless communication in connection with portable terminals. In this system, a terminal is connected to the financial institution via a wireless or cellular telephone hook-up. It is a feature of the invention that so-called "smart cards" are utilized to verify authorization for transactions, thereby minimizing potential security problems which could otherwise result from use of a mobile terminal. According to an alternate embodiment of the invention, a smart card is advantageously utilized not only for authorization, but also to maintain a secure record of available funds.

According to another embodiment of the invention, a portable transaction terminal is internally powered by, for example, rechargeable batteries. In an alternate embodiment, the terminal is powered by a standard ac power supply through a conventional outlet.

In yet another embodiment of the invention, a cellular telephone, having a smart card reader incorporated therein, is utilized as a data terminal for various financial transactions.

According to a further embodiment, the system not only provides the functionality of an ATM network, but also provides non-financial services thereby forming an integrated system.

The above, and other objects, features and advantages of the present invention will become readily apparent from the following detailed description thereof which is to be read in connection with the accompanying drawings.

DETAILED DESCRIPTION OF THE PREFERRED EMBODIMENTS

Figure 1:
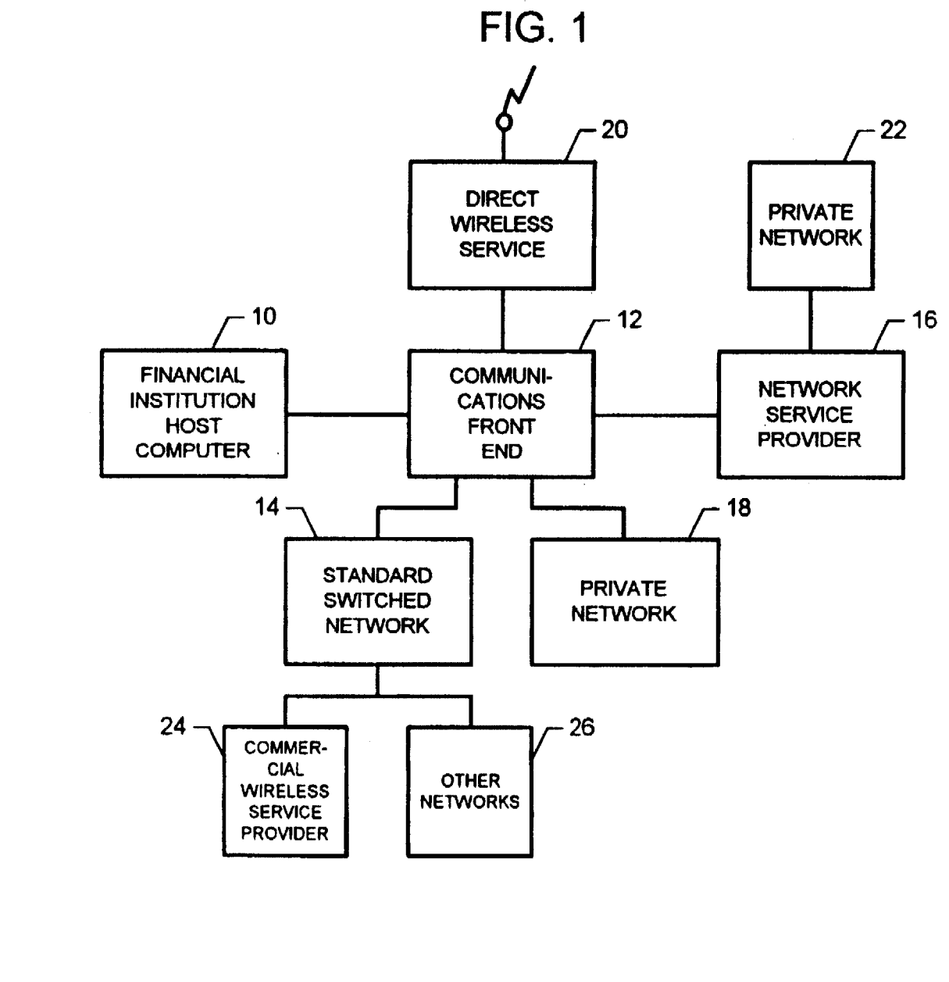
FIG. 1 is a block diagram of a financial information and transaction system in accordance with the invention.

FIG. 1 is a block diagram illustrating a system for providing financial information and performing financial transactions in accordance with the present invention. In this embodiment, a financial institution is represented by block 10. As known in the art, the financial institution, such as a consumer banking institution, utilizes an automated system, including a host computer, for maintaining records of customer accounts. These records are used to keep track of funds in the customer accounts, to enter debits and credits made to such accounts, and for other purposes.

In order to provide various services to the customer, such as providing account information and account debiting and crediting at the customer's request, a communications front end 12 is used to exchange data corresponding to such information. The communication front end 12 provides access to the host computer operated by the financial institution 10 from a variety of communication systems. For example, as shown, the communications front end 12 may exchange data with a standard switch network 14, such as one operated by a regional telephone company. Thus, data transfer utilizing such a system generally takes place over the telephone line. In this way, data may be exchanged with a user suitably linked to the standard switch network 14 with a modem using any of a variety of communication protocols known in the art. Moreover, data may be exchanged in this way other financial institutions and financial networks (not shown), for example, to provide data for settlement of various customer transactions.

Alternately, the communication front end 12 may be connected to a network service provider 16 or a private network 18. For example, one of several commercial services now available may link users throughout a geographic area. Further, the communications front end 12 may provide an interface between the financial institution 10 and a private is network 18 comprising, for example, one or more local area networks (LAN) or wide area networks (WAN).

Further, the communications front end in this representation is connected to a direct wireless service 20. For example, such a hook-up could operate at a very high frequency (900 megahertz) along a cellular telephone-type or spread spectrum type connection (900 megahertz with multiplexers) for security purposes. The signal from the direct wireless service 20 may be received by a number of different types of terminals, described below.

As illustrated, FIG. 1 shows direct links between the communications front end 12 and the various types of communication systems 14, 16, 18, and 20. However, it will be understood by those skilled in the art that various combinations of such systems, and others, are possible. For example, a private network 22 may be accessed with the communications front end 12 through a network service provider 16. Alternatively, rather than the direct wireless communication represented by block 20, wireless communication may take place using various commercial wireless service providers 24 via the standard switch network 14. Other networks 26, such as the so-called "Internet," may be accessed with the standard switch networks 14.

Figure 2A:
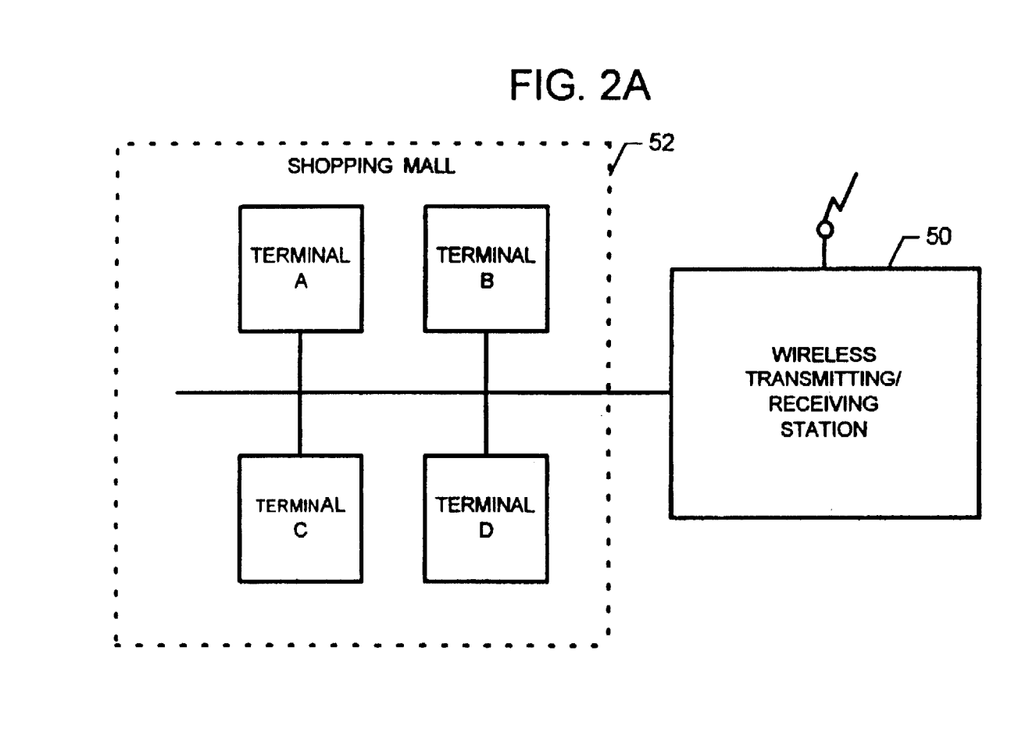
FIG. 2A is a block diagram of a first application of the invention which includes a wireless transmitting/receiving station.
Figure 2B:
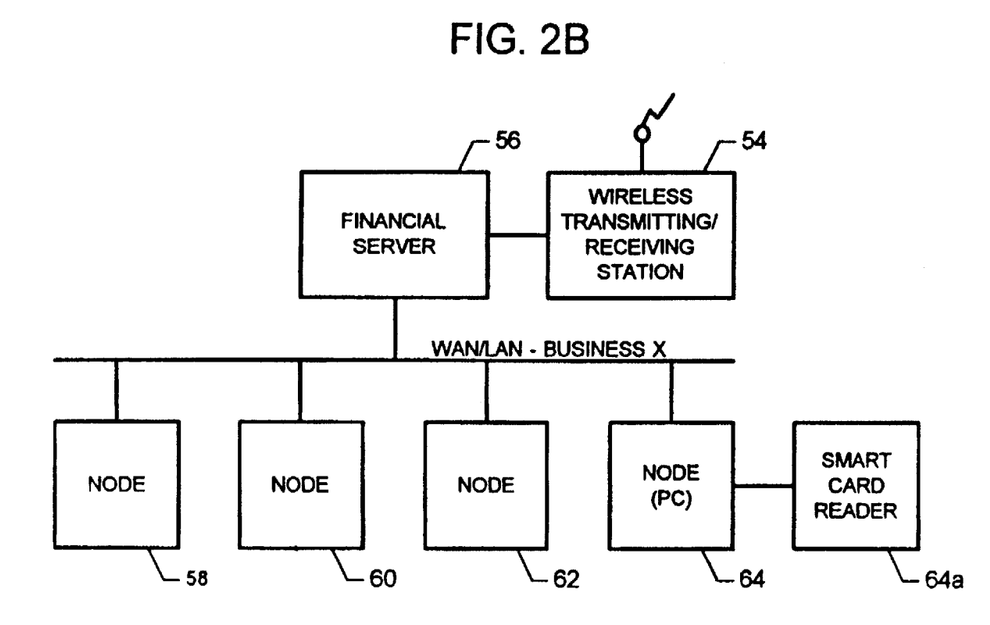
FIG. 2B is a block diagram showing a second application of the invention which includes a wireless transmission/receiving station.
Figure 2C:
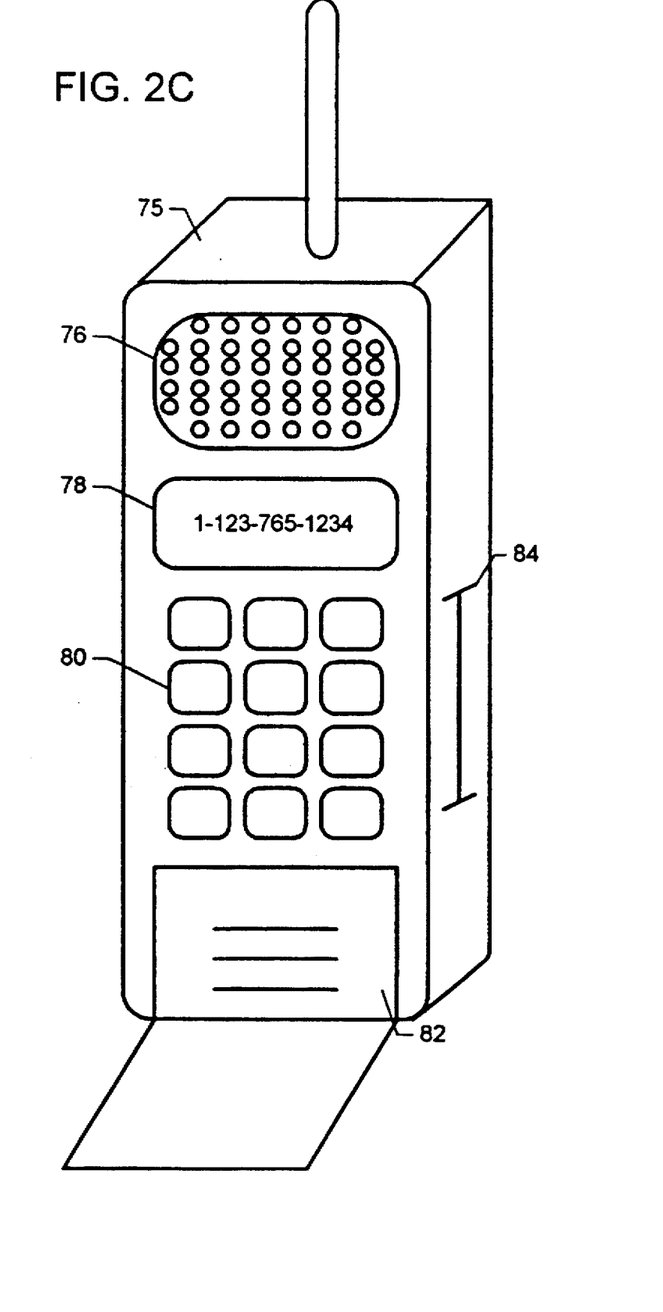
FIG. 2C is a perspective view of a cellular telephone terminal in accordance with the invention.

FIGS. 2A to 2C illustrate various applications in which wireless data transmission may be utilized to provide convenient access to a financial institution, such as the financial institution 10 mentioned above, in relation to FIG. 1. For example, FIG. 2A illustrates an application in which a wireless transmitting and receiving station 50 is operatively linked to various terminals A to D distributed in a shopping mall 52 or other localized area.

In FIG. 2B, a wireless transmitting and receiving station 54 is operatively linked to a financial server 56 associated with LAN or WAN of a business. Various nodes 58, 60, and 64 are provided along the network of the business. One such node 64 shown in FIG. 2B may comprise a personal computer which includes a smart card reader 64a.

In FIG. 2C a cellular telephone 75 serves as a financial information and transaction terminal. In this embodiment, the cellular telephone 75 includes standard features such as an alpha-numerical keypad 80, a speaker portion 76, a microphone portion 82, and a display 78 (for example, a LCD display). Additionally, a smart card reader portion 84 is provided. This additional feature provides the additional capability to perform financial transactions using the keypad 80 as an interface. The functionality of this embodiment and of those described above is apparent from the ensuing description.

Figure 3A:
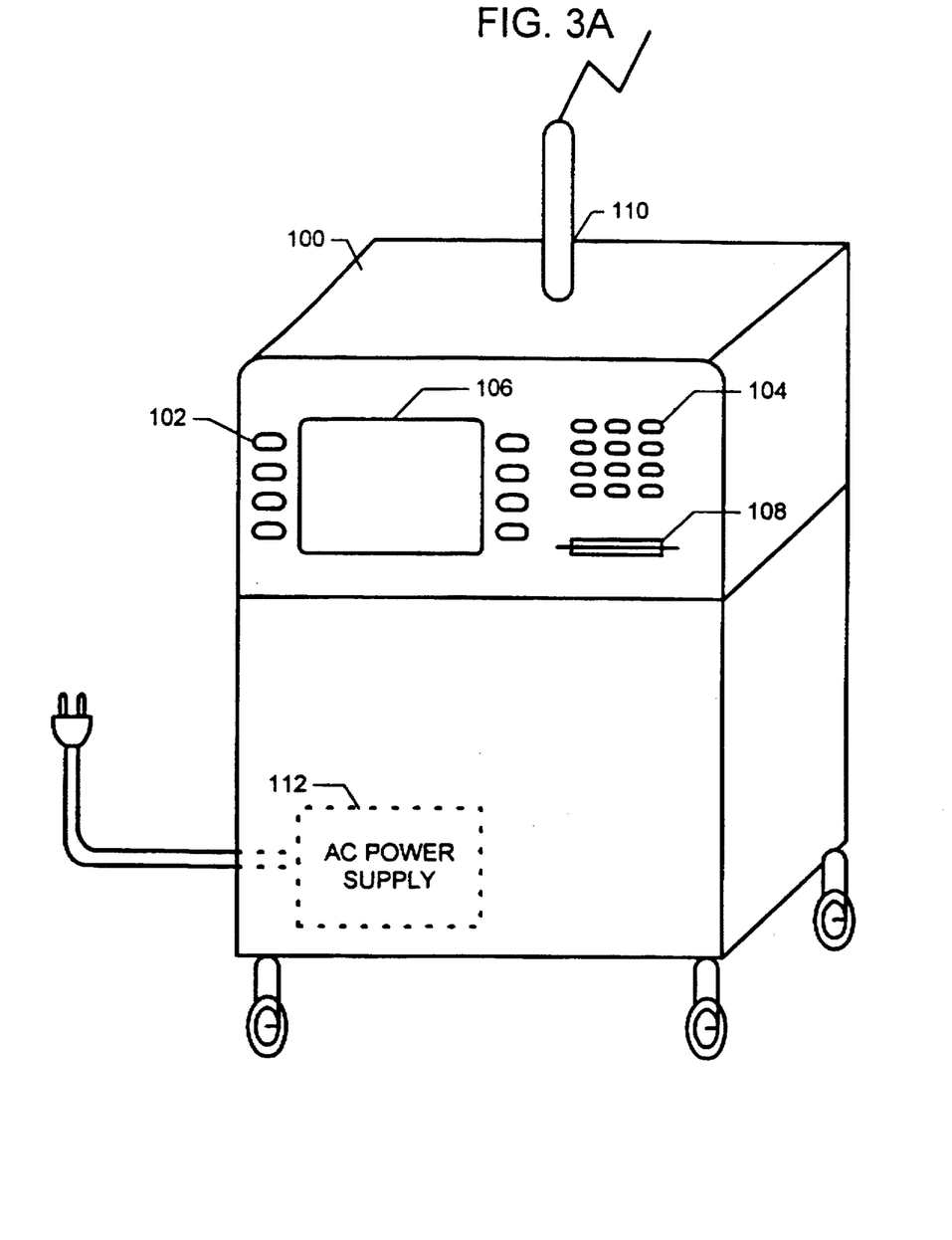
FIG. 3A is a perspective/block view of a first portable wireless transaction and information terminal in accordance with the invention.
Figure 3B:
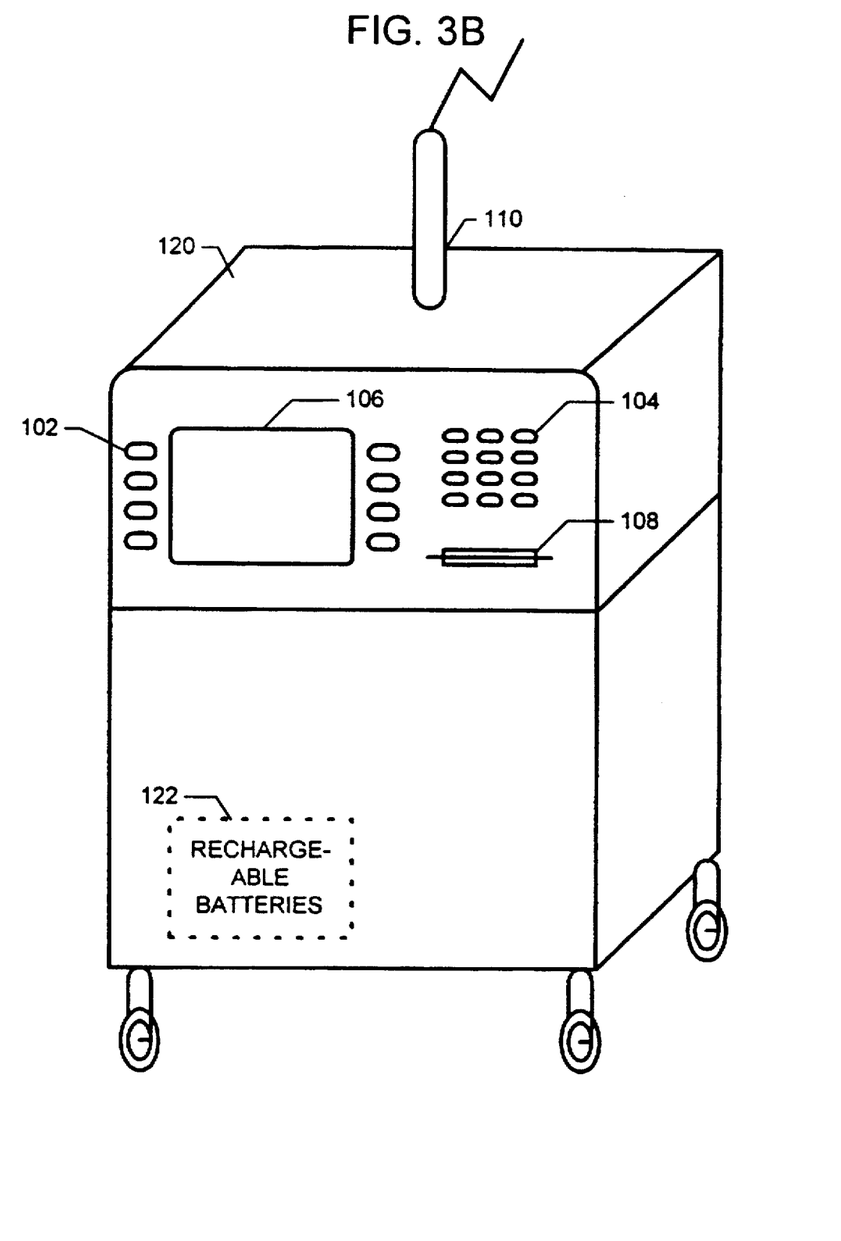
FIG. 3B is a perspective/block view of a second portable wireless transaction and information terminal in accordance with the invention.

FIGS. 3A and 3B illustrate in greater detail embodiments of a portable, wireless terminal in accordance with the invention. In both of these embodiments and in those which are later described, use is made of a smart card and a smart card reader. As is known in the art, a smart card is a device which may include processing means as well as both volatile and non-volatile memory. Data stored in read-write memory on the smart card may be exchanged with a reader device, typically through a serial interface. One advantage of such use of the smart card is that encryption algorithms may be stored and processed with the smart card to allow the smart card to be validated from a remote location, for example, by a host computer operated by a financial institution. In this way, information can be securely exchanged between the card and the remote location using one or more encryption keys that are in place in both locations. The encryption keys are used to encode information to be transmitted and to decode information that is received.

Using encryption techniques, it is possible not only to encode financial information stored remotely by a host computer or locally on the smart card, but also to encode identification information, such as personal identification numbers (PINs). In this way a user's PIN may be encrypted by the smart card and communicated to a remote host which has the same encryption key to decode the encrypted PIN and to validate it. This provides authorization to access information stored by the host and/or to request various financial transactions.

FIG. 3A illustrates a first wireless terminal 100 for use with a smart card. This terminal 100 includes a customer interface 102, such as an alpha-numerical keypad 104, a display 106, and a smart card reader 108. Signals provided from a wireless service provider, such as one described in FIG. 1, are received by a transmitter/receiver portion 110 of the terminal 100. Conversely, signals are provided from the transmitter/receiver portion 110 of the terminal 100 to a front end processor via wireless service provider. In this manner, the terminal 100 may be used to wirelessly receive and transmit data to and from a financial institution or financial network. This data may then be read and write from and onto a smart card that is inserted into the smart card reader 108.

In this embodiment, the terminal 100 may be advantageously used to read data stored on a smart card to determine, for example, a value corresponding to an amount of funds existing in the user's account. With the terminal 100, the user may add to the amount stored on the card and have the added amount debited from the user's account by the host computer. In such a way, the terminal thereby functions as a credit-authorization terminal. The authorization and financial information is kept secure during transmission as a result of the encryption capabilities of a smart card that is used to access the terminal 100.

For example, the user may insert a smart card into the smart card reader 108. The card first encrypts, then transmits to the terminal 100 information stored on a smart card. This information identifies the financial institution which maintains the user's account as well as the user's account number. Additional security may be obtained by requiring that the user input a PIN with the numeric keypad. Again, the smart card can then encrypt the PIN for transmission by the terminal to a host computer for verification.

Once authorization has been obtained, the user may determine the user's current account balance and/or request that value be added to the card. In executing these requests, the terminal exchanges encoded information by wireless transmission with a financial network, such as one described above with respect to FIG. 1. For example, the terminal may be used to directly add value to the user's card, and then request by wireless transmission that the customer's account be debited a corresponding amount. These requests comprise encoded data which is decoded by the host computer associated with financial institution.

When the funds are transferred to and from the smart card, an encrypted bank signature appended to the funds certifies that the funds are "real." It also ensures that when the transaction enters the settlement system, the funds are validated. Because the settlement system may involve more than one financial institution, when the transaction is ultimately presented to the financial institution for payment, the encrypted bank signature verifies that the transaction is authentic.

In the embodiment shown in FIG. 3A, the terminal 100 may operate with a standard ac supply 112 from a conventional outlet. In the embodiment of FIG. 3B (in which identical reference numerals are used to refer to corresponding structure described in reference to FIG. 3A), a terminal 120 is powered by rechargeable batteries 122 in order to provide even greater mobility.

It will be appreciated that such a terminal as described in reference to FIGS. 3A and 3B permits the user to conduct numerous financial transactions without a hard wired connection between the terminal and the financial institution. For example, the terminal can be used to "recharge" a smart card in the manner described above. After "recharging," the user may then use the card in connection with terminals that accept this "electronic cash" in lieu of cash by deducting an amount from the user's card. The amount deducted can then be redeemed by a merchant through a settlement process with the user's financial institution (and others).

It can be seen that the terminal described in FIGS. 3A and 3B is a truly mobile unit and enjoys the benefits of such mobility. Because the terminal is not required to dispense cash, no safe is required. This, in turn, reduces the cost and size of the terminal and maximizes the flexibility of the design of the terminal. For example, the terminal may be positioned in the corridor of a mall or an office building, thereby maximizing its access and availability to foot traffic during the day. At night, the terminal could be rolled back in from the corridor and accessed for settlement/verification procedures in accordance with standard industry practice with ATMs. In the embodiment of FIG. 3B, the terminal's batteries could be recharged during this time for use the next day.

Alternatively, the mobile terminal could be positioned on a truck which could be parked outside at a fair or sporting event and powered by batteries or a generator stored on the truck. Again, the mobile terminal is positioned to maximize access to foot traffic and is repositioned at night for recharging, servicing, etc. Positioned in this way, the above-described terminals provide increased flexibility and adaptiveness for responding to customer demands.

Figure 4:
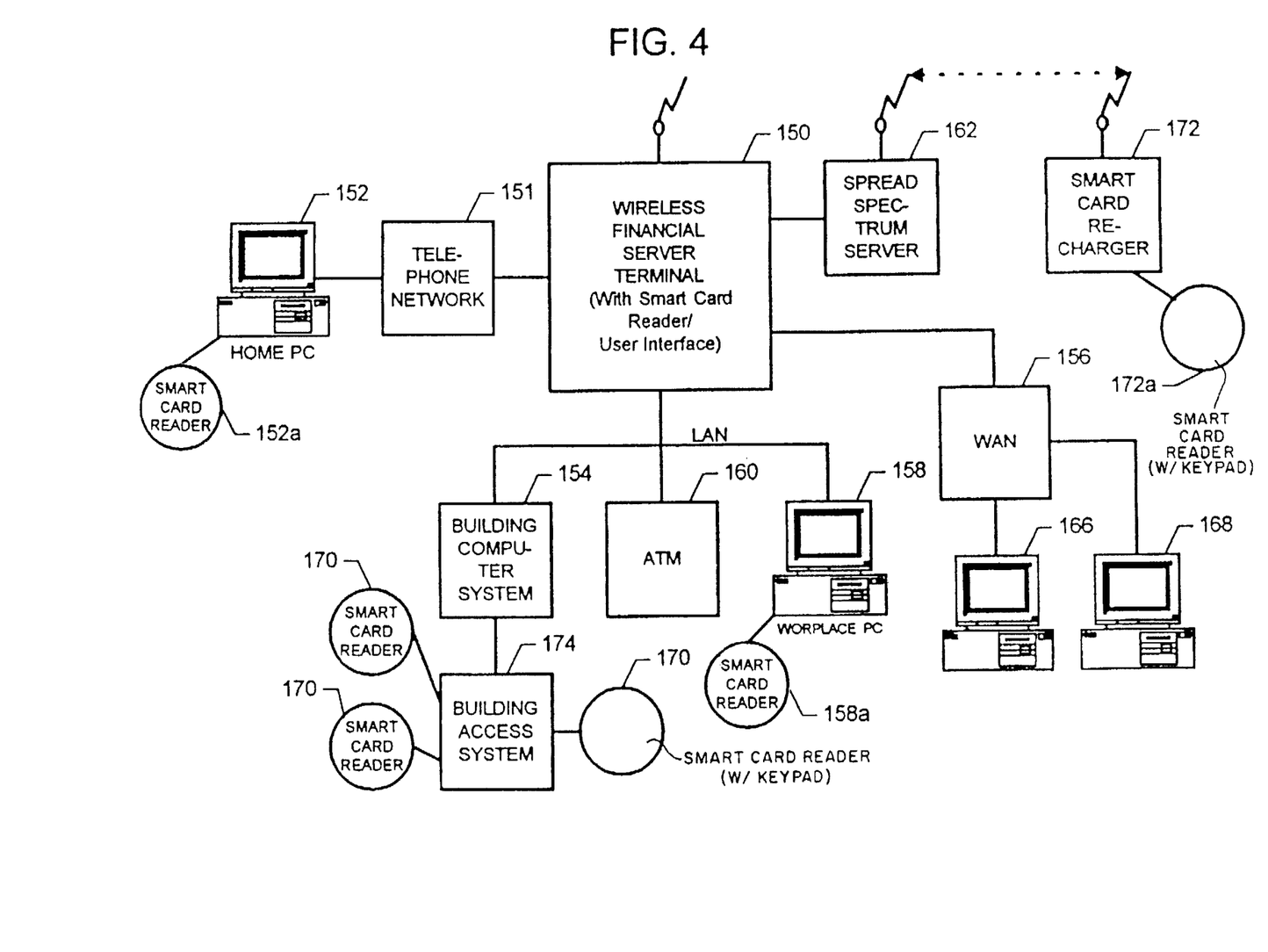
FIG. 4 is a block diagram of a wireless transaction and information system in accordance with the invention.

FIG. 4 illustrates another embodiment of the invention in which a wireless server/terminal unit 150 is used to exchange financial information between a user and a remote host computer of a financial institution, such as that referred to in FIG. 1. The wireless server/terminal unit 150 preferably includes a terminal described above in reference to FIGS. 3A and 3B (that is, one which incorporates a display, a keypad, a smart card reader, and means for wireless transmission of data).

The system shown in FIG. 4 integrates the capability of exchanging financial information with other non-financial functionality, such as security control. In particular, the wireless server/terminal unit 150 forms a portion of a LAN which comprises a variety of other computers and networks. As illustrated, these other computers and networks include an employee's work place PC 158, an employee's home PC 152, a WAN 156, a local building computer system 154, a conventional ATM 160, and a spread spectrum server 162.

A variety of terminals and associate device are coupled to the networks shown. For example, the WAN 156 includes PCs 166 and 168. A building access system 174 includes various smart card readers 170, some of which are equipped with keypads. Similarly, each of the employee PCs 152 and 158 are equipped with smart card readers 152a and 158a.

Also, a plurality of terminals, represented by the terminal 172, are coupled to the spread spectrum server 162. For example, the terminal 172 is equipped with a smart card reader 172a. In this way, the wireless financial server terminal 150 enables employees to access their financial institution through a variety of means and from a variety of locations in the work place and at home.

In particular, the wireless smart card recharge station 172 communicates to the financial institution via the spread spectrum receiver 162 and the server terminal 150. The recharge station 172 has a slot for receiving and reading a smart card and a display (see FIGS. 3A and 3B). Through its connection with a financial system, such as that shown in FIG. 1, the user makes selections from a menu displayed on the display of the terminal 172. For example, the user may review account balances, transfer funds, or perform other activities typically available on a fixed-location ATM. The user may also reload monetary value onto the smart card via the cash station, adding set funds to either a "prepaid" or "purse" account on the smart card as described below. In this way the user can obtain access to money via a portable ATM-type terminal without security risk because no cash is directly involved. At the end of the user's visit to a location where the smart card is honored, the user may employ the station to deposit any unused balances from the user's smart card to the user's account with the financial institution.

As shown, a user's PC 152 may be connected to a smart card reader, such as one having a keypad and processing capabilities. This enables the user to access the user's financial accounts and to "recharge" the smart card (that is, add funds onto the smart card). In this respect, the keypad enables the user to enter the user's PIN and the smart card inserted into reader 152a provides additional encryption and security measures to make the transport route (namely, the LAN/wireless terminal/route) sufficiently secure to conduct financial transactions. A similar arrangement is conducted at other remote locations through a telephone line connection between the terminal and the employee's home personal computer connected to a smart card reader/processor and keypad. Further, a smart card reader/processor with a display which simulates an ATM protocol could be connected to the terminal, thereby enabling the user to perform all ATM functions including recharging the smart card, without the use of a personal computer.

Thus, the server terminal 150 provides a communications channel for several remote devices, such as the home PC 152, the work place PC 158 and the terminals 172 associated with the spread spectrum server 162 and those associated with the wide area network 156. By providing card readers with these terminals, it is possible to obtain a wide range of access points to a remote host computer via the wireless financial server/terminal. This provides additional capabilities to the above-described financial information and transactions.

Additionally, the embodiment of FIG. 4 describes an integrated system which may be used for other non-financial transactions. For example, the building computer system 154 noted above may be used to control a building access system 174. The building access system of this example includes a plurality of smart card readers and/or keypads. Such interface devices may be used to verify that a user is authorized to enter particular areas by matching information stored on a smart card against security records maintained or updated through the server/terminal unit 150. Different security levels may be instituted for different areas, each requiring additional authorization. For example, it may only be necessary to insert a card to access a parking garage, while gaining access to particular rooms may require additional authorization, for example, the inputting of a PIN with a keypad.

Figure 5:
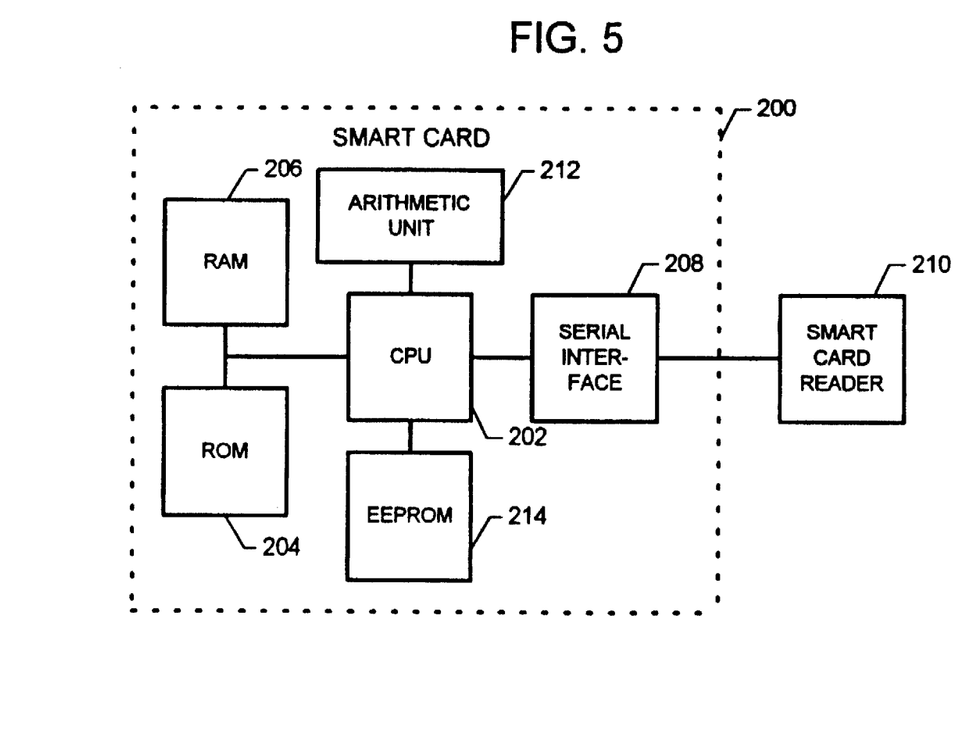
FIG. 5 is a block diagram of a smart card according to the invention.

FIG. 5 illustrates a multi-purpose smart card 200 which permits both financial and non-financial functions in an integrated system such as that described in FIG. 4. The smart card 200 comprises a central processing unit 202 (CPU) which is connected to a read only memory 204 (ROM), primarily used for storage of an operating system. A random access memory 206 (RAM) is also provided for volatile storage of data, particularly for program execution. The CPU 202 is operatively coupled to a serial interface 208 which in turn communicates with a smart card reader 210 according to techniques well known in the art.

The CPU is connected to an arithmetic logic unit 212, for example, one suitable for processing large keys (512 byte keys). An electrically erasable programmable read only memory 214 (EEPROM) is provided, which typically stores system files and applications.

Figure 6:
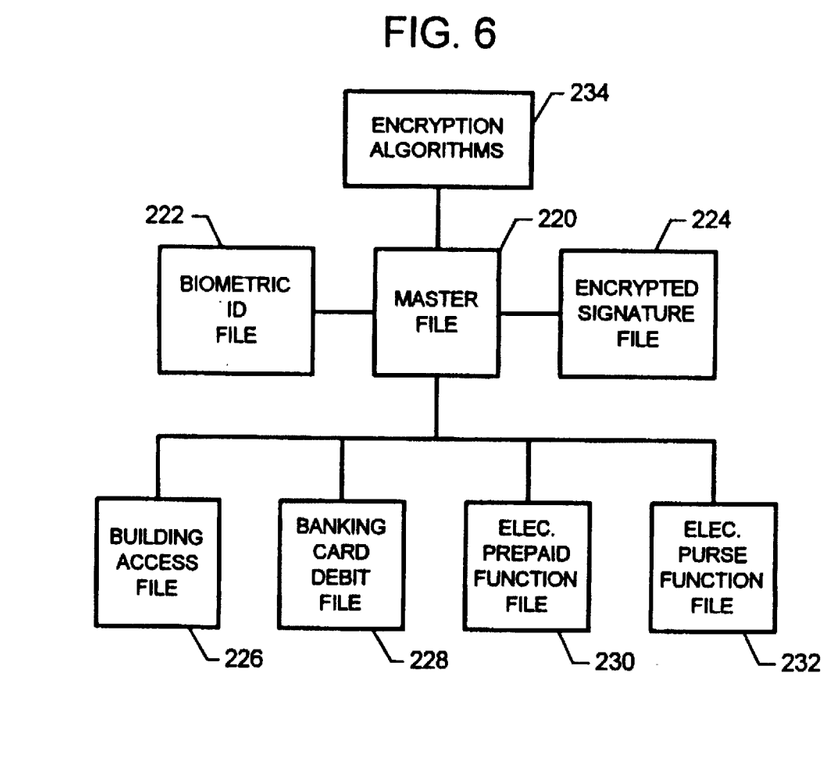
FIG. 6 is a block diagram of a file structure of the smart card of FIG. 5.

As illustrated in FIG. 6, the smart card 200 of FIG. 5 has different file paths for different functions. The EEPROM has a master file 220 and dedicated files for different applications. These dedicated files include a biometric identification file 222 and an encrypted digital signature file 224. Also included is a building access file 226 that contains information which enables the card to be used in conjunction with a security system, such as the one referred to in FIG. 4. The master file 220 also is linked to a banking card debit file 228 which may also have its own security path for identification. The smart card has a prepaid function path 230 which can only be loaded through a secure function, and a "non-secure" electronic purse function file 232. These files are readable by an external terminal, such as the terminal described in reference to FIGS. 3A and 3B, and may be decremented as required from an outside terminal, as described more fully below.

In this example, the master file 220 also has a digital encryption capability 234 providing algorithmic computation for the processing of digital keys and encryption of, for example, the user's PIN. The algorithms used may provide symmetrical or asymmetrical encryption as known in the art.

While the smart card utilized in the invention embodies a "computer", it has a fairly limited memory. For example, the EEPROM may be limited to the range between 3 to 8 kilobytes with current technology limitations. Accordingly, the smart card in the system preferably acts as an enabling device for other systems according to known techniques. For example, the smart card provides validation of the individual and the service requested, but does not store large quantities of data on the card.

It should be understood from the above description that as the mobility of an ATM-type terminal increases, security concerns may also increase. More specifically, it may be unfeasible to place cash in a mobile ATM due to the possibility of theft of the terminal. Use of a smart card enables the system to provide users with secure purchasing in a cash-free environment.

Further addressing this concern, the smart card 200 of FIGS. 5 and 6 includes two storage areas for storing monetary values. The first is an "electronic purse" represented by file 232. This area is used, for example, when the user makes a high value purchase by placing the smart card in a merchant's terminal. The user accepts the transaction and amount of the purchase entered by the merchant by entering the user's PIN. The user then approves the amount, for example, by pushing an "enter" button on a terminal keypad, the card purse cash value is then debited by the requested amount, and, conversely, the merchant's account is credited that amount.

A second area for storing monetary values on the card comprises a "pre-paid account" represented by file 230. This account is generally utilized for lower value purchases, for example, fifty dollars or less. This account is kept in an unsecured cash area of the smart card and operates essentially like cash. For example, the user of the smart card may make purchases from this account without entering the user's PIN. Possible uses would include, preferably, low value, fast transactions such as at a cafeteria, or a vending machine, or when placing a local telephone call.

The smart cards referred herein interface with the system through the use of various smart card reader/processors. These processors vary in complexity and sophistication depending upon the application. For example, when used to regulate building access, the smart card may be inserted into a smart card reader which simply identifies the user. This could be used in lower security areas, such as parking garages. A numerical keypad, by which a user's PIN may be entered, can be required for added security, such as at building door entrances. For even further security, some biometric parameter (such as a fingerprint) may be used for identification. This same access code with or without a PIN can be used in a smart card reader attached to a stand-alone or network personal computer 158A to control the level of access to local or remote files, communication networks, databases and network services.

In the aforementioned embodiments, the smart card incorporates optional digital encryption signatures and encryption algorithms to enable the smart card to be validated from a remote location, such as a host computer at a financial institution or at off/on line merchant terminals equipped with a SAM module for off-line card authentication. In such instances both ends of the communication (for example, the host computer and the smart card) may each have an encryption key so that data (such as a PIN entry) which is sent via the smart card 60 is validated at the host computer. Thus, the host computer is able to validate that the smart card is authentic and that the proper user is using the smart card so that a financial transaction can take place.

In a wireless off-line situation, the smart card and the terminal being used similarly validate one another because there is a possibility that a false terminal is being used. Accordingly, even in an off line system, security measures are available to validate the card, the terminal, and the user.

Various preferred embodiments of the invention have now been described in fulfillment of the objects of the invention. While these embodiments have been set forth by way of example, various other embodiments and modifications will be apparent to those skilled in the art. Accordingly, it should be understood that the invention is not limited to such embodiments, but encompasses all that which is described in the following claims.

What is claimed is:

1. A financial information and transaction system comprising:
   a host financial computer system, said host system maintaining records of user account information;
   a plurality of user interface terminals for accessing said host financial computer system, at least one of said terminals comprising first means for wirelessly transmitting and receiving data, and a smart card reader;
   a wireless communications interface comprising a second means for wirelessly transmitting and receiving data operatively counted to said at least one of said terminals comprising first means for wirelessly transmitting and receiving data; and
   a communications interface coupled to said wireless communications interface and coupled to said host system;
   wherein data corresponding to said user account information is exchanged between said host system and said at least one of said terminals comprising first means for wirelessly transmitting and receiving data via said wireless communications interface and said communications interface, such that a user obtains information and performs transactions on said host financial system through a smart card device that is coupled to said smart card reader, said smart card device including means for encrypting data which is exchanged with said host financial system.

2. The financial information and transaction system according to claim 1, wherein said communication means comprises means for transmitting and receiving data at a frequency of about 900 megahertz or more.

3. The financial information and transaction system according to claim 1, wherein said at least one terminal comprises a plurality of of said terminals devices coupled to a common wireless transmitting and receiving station.

4. The financial information and transaction system according to claim 1, wherein said plurality of of said terminals are arranged in a local area network.

5. The financial information and transaction system according to claim 1, wherein said at least one of said terminals comprises a wireless cellular telephone device.

6. The financial information and transaction system according to claim 5, wherein said wireless cellular telephone device includes a smart card reader incorporated therein.

7. The financial information and transaction system according to claim 1, wherein said at least one of said terminals comprises a portable terminal that includes a keypad and display.

8. The financial information and transaction system according to claim 7, wherein said portable terminal is supplied with ac power from a standard power supply.

9. The financial information and transaction system according to claim 7, wherein said portable terminal is battery operated.

10. The financial information and transaction system according to claim 4, wherein local area network includes a plurality of personal computers, each having smart card readers by which a user encrypts and decodes data which is exchanged with said host system.

11. The financial information and transaction system according to claim 1, wherein said at least one terminal is operatively coupled to a security system for controlling access to various physical locations each associated with a smart card reader, said security system providing access to said various locations by matching information stored on a user smart card which is inserted into said associated smart card readers.

12. The financial information and transaction system according to claim 1, wherein said smart card device includes a plurality of files stored therein.

13. The financial information and transaction system according to claim 12, wherein one of said plurality of files corresponds to an encryption key which is executed by processing means provided in said smart card device, thereby encrypting data provided to said smart card device.

14. The financial information and transaction system according to claim 12, wherein one of said plurality of files is a banking card debit file, said banking card debit file containing data elements for execution of a debiting of said user account.

15. The financial information and transaction system according to claim 12, wherein one of said plurality of files is an electronic prepaid function file, said electronic prepaid function file maintaining data elements representative of a monetary value which is augmented or decremented by said at least one of said terminals upon authorization by the user.

16. The financial information and transaction system according to claim 15, wherein said authorization is obtained by the user inputting a personal identification number associated with the user's account.

17. The financial information and transaction system according to claim 13, wherein one of said plurality of files is an electronic purse function file , said electronic purse function file maintaining data elements representative of a monetary value which is augmented or decremented by said at least one of said terminals.

18. The financial information and transaction system according to claim 1, wherein said at least one of said terminals is coupled to a security system for controlling access to various physical locations each associated with a smart card reader, wherein said smart card device includes at least one file containing data elements for providing authorization to access one or more of said physical locations.

19. The financial information and transaction system according to claim 18, wherein said smart card device includes a biometric identification file which contains identification data corresponding to unique physical characteristics of a user, said identification data being used to authorize access to one or more of said physical locations.

20. The financial information and transaction system according to claim 18, wherein said authorization to access said one or more physical locations is obtained by the user inputting a personal identification number associated with the user.

21. The financial information and transaction system according to claim 1, wherein said at least one of said terminals is coupled to a host system for controlling access to a communication network and wherein said smart card device includes at least one file containing data elements for providing authorization to access said communication network.

22. The financial information and transaction system according to claim 1, wherein said at least one of said terminal is coupled to a host system for controlling access to a network device and wherein said smart card device includes at least one file containing data elements for providing authorization to access said network service.

23. The financial information and transaction system according to claim 1, wherein said at least one of said terminals is coupled to a host system for controlling access to a data base and wherein said smart card device includes at least one file containing data elements for providing authorization to access said data base.

24. The financial institution and transaction system according to claim 21, wherein said smart card device includes a biometric identification file which contains identification data corresponding to unique physical characteristics of said user, said identification data being used to authorize access to said communication network.

25. The financial information and transaction system according to claim 22, wherein said smart card device includes a biometric identification file which contains identification data corresponding to unique physical characteristics of said user, said identification data being used to authorize access to said network service.

26. The financial institution and transaction system according to claim 23, wherein said smart card device includes a biometric identification file which contains identification data corresponding to unique physical characteristics of said user, said identification data being used to authorize access to said data base.

27. The financial information and transaction system according to claim 21, wherein said authorization to access said communication network is obtained by the user inputting a personal identification number associated with the user.

28. The financial information and transaction system according to claim 22, wherein said authorization to access said network service is obtained by the user inputting a personal identification number associated with the user.

29. The financial information and transaction system according to claim 23, wherein said authorization to access said data base is obtained by the user inputting a personal identification number associated with the user.

30. The financial information and transaction system according to claim 1, wherein said plurality of terminals are arranged as part of a wide area network.

31. The financial information and transaction system according to claim 1, wherein said terminal comprises an automatic teller machine.

* * * * *